United States Patent
Low

(10) Patent No.: US 6,589,422 B2
(45) Date of Patent: Jul. 8, 2003

(54) APPARATUS AND METHOD FOR EXTRACTING BIOMASS

(75) Inventor: Robert Elliott Low, Northwich (GB)

(73) Assignee: Ineos Fluor Holdings Limited (GB)

( * ) Notice: Subject to any disclaimer, the term of this patent is extended or adjusted under 35 U.S.C. 154(b) by 0 days.

(21) Appl. No.: 09/739,163

(22) Filed: Dec. 18, 2000

(65) Prior Publication Data

US 2002/0074284 A1 Jun. 20, 2002

(51) Int. Cl.[7] .............................. B01D 11/00; C02F 9/10
(52) U.S. Cl. ..................... 210/259; 202/168; 210/179; 210/180; 210/182; 210/511; 210/634; 210/195.1; 422/258; 554/8; 554/12
(58) Field of Search ........................... 210/175, 177, 210/178, 179, 180, 181, 182, 195.1, 259, 511, 634, 263, 266; 422/255–259; 202/168, 169, 180, 185.1; 554/8, 9, 11, 12, 16, 20

(56) References Cited

U.S. PATENT DOCUMENTS

| | | | |
|---|---|---|---|
| 2,724,731 A | * 11/1955 | Findlay | |
| 2,850,362 A | * 9/1958 | Scheibel et al. | |
| 3,612,066 A | * 10/1971 | Jones et al. | |
| 4,278,012 A | * 7/1981 | Wheldon et al. | |
| 4,349,415 A | 9/1982 | De Filippi et al. | |
| 4,375,387 A | * 3/1983 | DeFilippi et al. | 202/169 |
| 4,518,502 A | * 5/1985 | Burns et al. | 210/634 |
| 4,770,780 A | * 9/1988 | Moses | 210/634 |
| 4,855,113 A | * 8/1989 | Yen | 422/259 |
| 5,092,983 A | 3/1992 | Eppig et al. | |
| 5,281,732 A | * 1/1994 | Franke et al. | 554/16 |
| 5,512,285 A | 4/1996 | Wilde | |
| 5,516,923 A | * 5/1996 | Hebert et al. | 554/12 |
| 5,626,756 A | 5/1997 | Heidlas et al. | |
| 5,707,673 A | * 1/1998 | Prevost et al. | 210/634 |
| 5,998,640 A | * 12/1999 | Haefele et al. | 554/12 |
| 6,022,453 A | * 2/2000 | Weber | 554/12 |

FOREIGN PATENT DOCUMENTS

| | | |
|---|---|---|
| EP | 932056 | 7/1963 |
| EP | 0 101 901 A2 | 3/1984 |
| EP | 0 616 821 A1 | 9/1994 |
| EP | 1 055 439 A2 | 11/2000 |
| EP | PCT/GB00/04850 | 9/2001 |
| GB | 2 320 025 | 6/1998 |
| GB | 9920942.1 | 10/2000 |
| JP | 62-067036 | 3/1987 |
| WO | WO 91/14373 A | 10/1991 |
| WO | WO 94/20486 | 9/1994 |
| WO | 99/13098 | 3/1999 |

OTHER PUBLICATIONS

K. Hoflmann et al., Chemie–Ingenieur–Technik, vol. 65, No. 12, p. 1510–1514, XP000415095, Dec. 1993; Weinheim, DE.

* cited by examiner

*Primary Examiner*—Joseph Drodge
(74) *Attorney, Agent, or Firm*—Cook, Alex, McFarron, Manzo, Cummings & Mehler, Ltd.

(57) ABSTRACT

Discloses is apparatus for extracting biomass from a biomass supply, including a hollow vessel in which is established a countercurrent flow of biomass in the form of liquid or particles of biomass entrained in a liquid and solvent. The vessel includes an outlet for a solvent/extract mixture at a first vessel side and an outlet for biomass at a second vessel side. The solvent/extract mixture outlet is coupled to a closed loop circuit that includes at least a separator which encompasses a condenser having first and second stages connected in series with the second of such stages operating at a lower temperature than the first stage and both stages supplying substantially uncontaminated solvent to the hollow vessel.

13 Claims, 1 Drawing Sheet

APPARATUS AND METHOD FOR EXTRACTING BIOMASS

Figure 1:
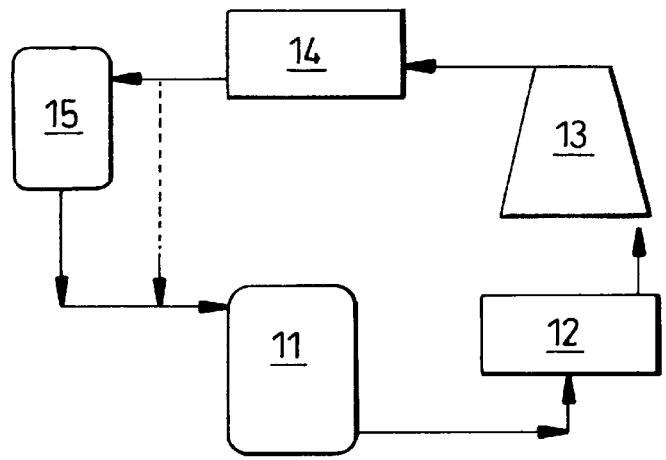

This invention concerns apparatuses and a method for "extraction" of biomass. This is the extraction of flavours, fragrances or pharmaceutically active ingredients from materials of natural origin (these materials being referred to as "biomass" herein).

Examples of biomass materials include but are not limited to flavoursome or aromatic substances such as coriander, cloves, star anise, coffee, orange juice, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable e.g. from plant material, a cell culture or a fermentation broth.

There is growing technical and commercial interest in using near-critical solvents in such extraction processes. Examples of such solvents include liquefied carbon dioxide or, of particular interest, a family of chlorine-free solvents based on organic hydrofluorocarbon ("HFC") species.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ hydrofluoroalkanes. Suitable examples of $C_{1-4}$ hydrofluoroalkanes which may be used as solvents include, inter alia, trifluoromethane (R-23), fluoromethane (R-41), difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), 1,1,1,2,3,3-hexafluoropropane (R-236ca), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1,1,1,2,3-pentafluoropropane (R-245cb), 1,1,2,3,3-pentafluoropropane (R-245ea) and 1,1,1,3,3-pentafluorobutane (R-365mfc). Mixtures of two or more hydrofluorocarbons may be used if desired.

An especially preferred hydrofluorocarbon for use in the present invention is 1,1,1,2-tetrafluoroethane (R-134a).

It is possible to carry out biomass extraction using other solvents, such as chlorofluorocarbon ("CFC's") or hydrochlorofluorocarbons ("HCFC's") and/or mixtures of solvents.

Known extraction processes using these solvents are normally carried out in closed-loop extraction equipment. A typical example 10 of such a system is shown schematically in FIG. 1.

In this typical system, liquefied solvent is allowed to percolate by gravity in downflow through a bed of biomass held in vessel 11. Thence it flows to evaporator 12 where the volatile solvent vapour is vaporised by heat exchange with a hot fluid. The vapour from evaporator 12 is then compressed by compressor 13: the compressed vapour is next fed to a condenser 14 where it is liquefied by heat exchange with a cold fluid. The liquefied solvent is then optionally collected in intermediate storage vessel (receiver) 15 or returned directly to the extraction vessel 1 to complete the circuit.

There are particular problems when the biomass is a liquid (typically aqueous) form. Examples of liquid biomasses include, but are not limited to, coffee and orange juice. Liquids containing solid biomass particles present similar difficulties. We refer to such biomasses herein as "liquid entrained" biomasses.

Hydrofluorocarbon (HFC) solvents have been found to be effective in extracting such biomasses. An example of a suitable HFC solvent is 1,1,1,2-tetrafluoroethane, sold as "R-134a" by the KLEA division of Imperial Chemical Industries plc. It would be desirable to provide an apparatus and method capable of continuous extraction of liquid or liquid entrained biomass using e.g. 1,1,1,2-tetrafluoroethane in liquid form.

According to a first aspect of the invention there is provided apparatus for extracting biomass from a liquid biomass supply. The apparatus comprises a hollow vessel containing a liquid, liquid or liquid-entrained biomass being supplied at or near a first side of the vessel and a liquid solvent being supplied at or near a second, opposite side of the vessel such that a stream of solvent passes in one direction through the vessel and a stream of biomass passes as a countercurrent through the vessel, so that biomass extract becomes entrained with the solvent. An outlet for biomass is at or near the second side of the vessel, and an outlet for solvent/extract mixture is at or near the first side of the vessel. A separator is connected to the solvent/extract outlet for separating solvent and extract from one another.

This apparatus advantageously allows intimate mingling of the biomass and the solvent so that the solvent efficiently strips the desirable components from the biomass and entrains them to a further location for separation of the solvent and biomass from one another.

The use of countercurrent flows makes the apparatus suitable for the continuous processing of liquid or liquid-entrained biomass. Conveniently in the apparatus the separator includes a rectifier for rectifying the solvent and separating therefrom the extract, a compressor, and a condenser connected in series, whereby the separator generates substantially uncontaminated solvent in liquid form. These features advantageously separate the desired biomass extract from the solvent whereby the extract is available for further use.

In the apparatus the separator includes a rectifier for rectifying the solvent and separating therefrom the extract, a compressor, and a condenser connected in series, whereby the separator generates substantially uncontaminated solvent in liquid form. The apparatus also includes pipework for supplying at least some of the substantially uncontaminated solvent from the condenser to the hollow vessel in a substantially closed loop circuit that includes the said vessel. This advantageously allows recycling of recovered solvent for contact with further biomass.

In preferred embodiments the separator includes a rectifier for rectifying the solvent and separating therefrom the extract, a compressor, and a condenser connected in series, whereby the separator generates substantially uncontaminated solvent in liquid and wherein the condenser includes first and second condenser ages connected in series, the second condenser stage operating at a lower temperature than the first stage and both condenser stages supplying substantially uncontaminated solvent to the hollow vessel. This is because there are sometimes residual inerts (air, carbon, dioxide, etc) in the aqueous feed stream of biomass. The solvent entrains some of these inert compounds to the condenser. Condensation in the presence of inerts is sometimes difficult. The second condenser stage advantageously separates inerts from the solvent.

The second condenser stage preferably operates at a lower temperature than the first stage. This removes heat from the solvent/inert compound mixture.

Even using a two-stage condenser, some uncondensed vapours may remain. Therefore the second condenser stage advantageously includes a vent for venting uncondensed vapours therefrom.

Preferably the vent is connected to an adsorbent filter that adsorbs solvent in the vented vapour. This advantageously recovers yet more of the solvent.

An example of a suitable adsorbent filter is a bed of activated carbon.

The separator as earlier defined may advantageously have a rectifier (still) for rectifying the solvent and separating therefrom the extract, a compressor, and a condenser connected in series. The separator generates substantially uncontaminated solvent in liquid form and the rectifier includes a still connected to the solvent/extract outlet of the hollow vessel. This still includes a heater for heating any solvent/extract mixture therein to a higher temperature than the solvent dewpoint. An outlet for solvent in vapour form is connected to supply such solvent to the suction side of the compressor, and a drain is provided for extract in liquid form.

Conveniently the still includes a vent and a reflux condenser forming part of the vapour path to the vent. In a preferred embodiment the reflux condenser operates at a higher temperature the solvent dewpoint and at a lower temperature than the mass extract dewpoint. Consequently the ref lux condenser recondenses any biomass fragrance compounds which undesirably distil from the still as a result of the heating mentioned in the last paragraph.

The countercurrent flow established in the hollow vessel entrains some solvent with the liquid biomass. Consequently the hollow vessel includes a biomass outlet which is connected in series to a heatable check tank, and thence to a further condenser for condensing solvent vaporised on heating of the tank. The further condenser includes an outlet for condensed solvent, the outlet being connected to supply solvent condensed in the further condenser to the hollow vessel. These advantageously permit recovery of solvent from the depleted biomass.

The solvent recovered from the depleted biomass may be recycled into the main solvent closed loop for further contact with biomass.

The check tank includes an outlet for liquid biomass residue. The biomass residue may, if necessary, undergo further solvent contamination. It may then be suitable for example animal feeds and landfill operations.

In particularly preferred embodiments the hollow vessel is an upright, elongate vessel through which a biomass stream rises and a solvent stream descends.

An alternative arrangement is one in which the hollow vessel is or includes a mixer-settler unit in which solvent and biomass streams flow in countercurrent.

In practice, there may be a series of mixer-settler units connected in series to define a multi-stage hollow vessel or a plurality of vessels.

Another arrangement is one in which a high intensity mixing device, e.g. a static mixer or inline jet spray mixer, is used to effect the contact and promote mass transfer. Typically such an arrangement could use a gravity setting tank, advantageously however an enhanced separation technology could be used. Examples of high intensity separation technologies include hydrocyclones or centrifugal separators, through which the working liquid, having acquired kinetic energy, may be passed. Various devices such as pumps may be used to impart kinetic energy to the working liquid.

The advantages of using e.g. an inline static mixer coupled with a hydrocyclone (or set of hydrocyclones arranged as desired) are that the inventory of solvent in the system can be reduced, and that the size of the extraction plant can be reduced to a bubble column and gravity settler. In addition the use of high intensity mixers reduces the potential for bypassing/short circuit flow of one of the phases, which could occur in a bubble type contactor.

According to a second aspect of the invention there is provided a method of extracting biomass wherein the biomass is in liquid or liquid-entrained form. The method comprises in a hollow vessel containing liquid, establishing countercurrent flows of liquid solvent and the biomass so that the solvent strips extract from the biomass, and passing the liquid solvent containing extracted biomass to a separating vessel. The solvent is biomass extract is drained from the separating vessel. The solvent evaporated from the extract in the separating vessel, and the is passed in vapour form to means for condensing the solvent, to a heatable check tank, and thence to a further condenser for condensing solvent vaporised on heating of the tank. The further condenser includes an outlet for condensed solvent, the outlet being connected to supply solvent condensed in the further condenser to the hollow vessel, and the check tank includes an outlet for liquid biomass.

This method is advantageously effective in extracting biomass in liquid (typically aqueous) form.

It is particularly preferable that the described method be carried out in a closed loop circuit. This permits efficient recovery of solvent, whose disposal would otherwise present problems.

A further, advantageous feature of the method that permits efficient recovery of solvent following practising of the method, is that the step of condensing the solvent includes the sub-steps of compressing the solvent in vapour form and condensing the solvent.

A still further advantageous feature of the method that permits efficient recovery of solvent following practising the method, is that the step of condensing the solvent includes the sub-steps of compressing the solvent in vapour form and condensing the solvent, and wherein the step of condensing the solvent includes two stages of condensation.

The method also advantageously includes the steps of passing depleted biomass to a further separator and separating further solvent from the biomass in a further separator. This permits recovery of solvent from the depleted biomass.

In particular when practising the method using the apparatus as defined herein, it is advantageous that one of the countercurrent flows occurs under gravity. This reduces the energy consumption of the apparatus.

Alternatively when practising the method using high intensity mixing and separation technologies, gravity may be used at the designer's choice, however the technology need not rely on use of gravity to separate the liquid. In this case (where gravity is not used to drive flow) the energy consumption may be higher (because of the pumping work used) but as the equipment will in general be much smaller there will normally stilt be all economic benefit.

Figure 2:
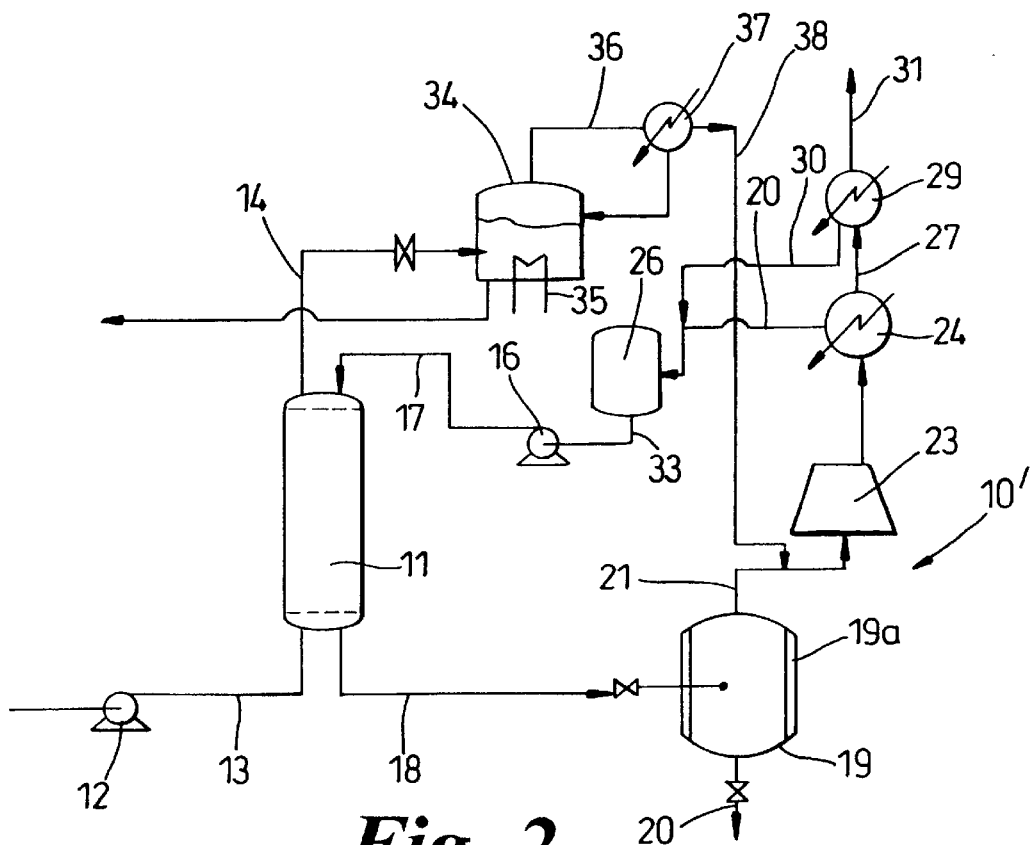

There now follows a description of the preferred embodiment of the invention, by way of non-limiting example, with reference being made to the accompanying drawings in which:

FIG. 1 is a schematic representation of a known biomass extraction apparatus, that is suitable for extracting biomass that is initially in solid form; and FIG. 2 is a schematic representation of an apparatus according to the invention.

Referring to FIG. 2 there is shown an apparatus 10' for extracting biomass.

Apparatus 10' includes as its primary converter an extraction vessel 11 that is in the preferred embodiment an elongate, upright cylinder.

Liquid biomass such as concentrated orange juice, coffee in aqueous form, etc is supplied by a pump 12 and supply line 13 to the interior of the base of vessel 11. As a result of pressure from the pump 12 the liquid biomass rises through the vessel 11, that is filled with liquid, and exits via a biomass outlet line 14 at the top of the vessel.

Solvent is supplied under the pressure of a pump 16 via a line 17 to the interior of the top of the vessel 11. The solvent falls under gravity through the vessel 11, and emerges via solvent/biomass extract outlet line 18 at the base of the vessel 11. The solvent/biomass extract mixture is then treated in a closed loop circuit whereby to separate the solvent and the extract from one another. The solvent is then recycled by line 17 for contact with further biomass in vessel 11.

A suitable solvent is R-134$a$. This has physical properties that are well suited for the extraction of biomass. R134$a$ is also approved for use in food applications.

Other solvents, including CFC's and HCFC's may also be employed, although these solvents are not approved for the extraction of biomass that has an ultimate food or medicinal use.

Mixtures of solvents may of course be employed.

The solvent/biomass extract mixture exiting via outlet line 18 passes to a rectifier in the form of still 19.

Still 19 includes e.g. a heating jacket 19$a$ or other, functionally equivalent, means for heating the solvent/extract mixture that is supplied thereto by line 18.

The heating action causes evaporation of the solvent, whose dewpoint is significantly lower than that of the biomass extract.

Evaporated solvent passes to a compressor/condenser portion of the circuit described in detail below.

The liquid biomass extract is, following evaporation of all the solvent in the mixture in the still 19, drained via biomass extract drain line 20 for further commercial use.

Still 19 may optionally include a, reflux condenser (not visible in FIG. 2) adjacent its solvent vapour outlet line 21. The purpose of the reflux condenser is to condense any volatile fractions of the biomass extract that are inadvertently entrained with the solvent vapour as it exits the still 19. Thus all desired components of the biomass extract are retained in the still 19 for subsequent draining via line 20. The undesirable solvent components pass via line 21 to the compressor/condenser portion of the circuit.

Line 21 is connected to the suction side of a compressor 23. This operates at a duty sufficient to compress the solvent vapour to allow its subsequent condensation.

The outlet of compressor 23 is connected to a first condenser stage 24.

The bulk of the solvent vapour condenses in condenser 24 and passes via line 25 to a hollow vessel 26 that acts as a solvent receiver.

In order to reduce the energy consumption of the process it may be desirable to use heat integration technology. In one such embodiment the vaporised, compressed solvent gas can be condensed directly as the heating medium in still jacket 19$a$, thus providing heating and cooling as required by still 19 and condenser 24. In an alternative embodiment the vapour can be condensed against a secondary heat transfer fluid (refrigerant) which operates in a closed heat pump (not shown in the drawings), whose output of heat drives still heating jacket 19$a$.

As noted above, some inert compounds such as air and carbon dioxide are present in the aqueous feed stream supplied via line 13. The inert compounds tend to entrain solvent. A vapour outlet 27 from condenser 24 is therefore connected to the inlet of a second condenser stage 29. This operates at lower temperature than condenser stage 24, to condense solvent in the presence of the inert compounds.

A liquid outlet 30 passes the thus condensed solvent portion to the receiver 26.

A vapour outlet 31 of condenser 29 allows the egress of gaseous components that do not condense in condenser 29. Such gaseous components may if desired be passed to e.g. an adsorbent bed for further stripping of solvent molecules therefrom. Thereafter the cleaned vapour components, including e.g. carbon dioxide and air, may be safely vented without risk of solvent contamination outside the closed loop of the apparatus.

Receiver 26 includes a liquid solvent outlet 33 that is connected to the suction side of pump 16, for recycling the thus cleaned solvent into the vessel 11.

Liquid outlet line 14 for depleted biomass is connected to an aqueous product check tank 34. Tank 34 includes a heater element 35 for heating of the liquid content thereof.

There is a vapour outlet line 36 at the top of vessel 34. Line 36 is, via a condenser 37, connected to the suction side of compressor 23. The gentle heating from the heating element 35 causes dissolved solvent to evaporate from vessel 34. Condenser 37 is optionally included to allow condensation of any extract or water which is also vaporised; however the condensation temperature is scheduled such that it is above the solvent dewpoint.

Condensate from this condenser drains back to tank 34. Uncondensed vapour is passed via line 38 to the compressor.

If desired a heat pump may be used to integrate the functions of heater 35 and condenser 37. In this case an external heat transfer fluid is used in either a compression or absorption cycle to supply heating and cooling as desired.

In use of the apparatus stripping of biomass extract from the aqueous feed in vessel 11 occurs continuously, and recovery and recycling of solvent also occurs on a continuous basis.

The plant may include suitable control apparatus such as a microprocessor for switching the various components such as the pumps 12 and 16 and the compressor 13, together with the heating jacket 19$a$ and the heater element 35. Alternatively, manually operated controls may be included.

A bubble column extractor as exemplified by vessel 11 is a good way of effecting gentle extraction. Alternative methods of contacting could be: a train of mixer-settler units with the solvent and process stream flowing in countercurrent, or a high-intensity static mixer followed by either a gravity settler or a hydrocyclone system.

A particular advantage of a high intensity static mixer and either a gravity settler or a hydrocyclone system is that the size of the solvent inventory can be significantly reduced. As disclosed herinabove the advantages of high intensity mixing are: small equipment size, and low inventory of solvent.

This offers benefits in both overall plant size and in the cost of solvent for the system.

What is claimed is:

1. Apparatus for extracting biomass from a liquid biomass supply, the apparatus comprising:
   a hollow vessel containing a liquid, liquid or liquid-entrained biomass being supplied at or near a first side of the vessel and a liquid solvent being supplied at or near a second, opposite side of the vessel such that a stream of solvent passes in one direction through the vessel and a stream of biomass passes as a countercurrent through the vessel, and such that biomass extract becomes entrained with the solvent;

an outlet for biomass at or near the second side of the vessel;

an outlet for solvent/extract mixture at or near the first side of the vessel; and a separator connected to the solvent/extract outlet for separating solvent and extract from one another, wherein the separator includes a rectifier for rectifying the solvent and separating therefrom the extract, a compressor, and a condenser connected in series, whereby the separator generates substantially uncontaminated solvent in liquid form; wherein the condenser includes first and second condenser stages connected in series, the second condenser stage operating at a lower temperature than the first stage and both condenser stages supplying substantially uncontaminated solvent to the hollow vessel; and wherein the second condenser stage includes a vent for venting uncondensed vapour therefrom, and wherein the vent is connected to an adsorbent filter that adsorbs solvent in the vented vapour.

2. Apparatus for extracting biomass from a liquid biomass supply, the apparatus comprising:

a hollow vessel containing a liquid, liquid or liquid-entrained biomass being supplied at or near a first side of the vessel and a liquid solvent being supplied at or near a second, opposite side of the vessel such that a stream of solvent passes in one direction through the vessel and a stream of biomass passes as a countercurrent through the vessel, and such that biomass extract becomes entrained with the solvent;

an outlet for biomass at or near the second side of the vessel;

an outlet for solvent/extract mixture at or near the first side of the vessel; and a separator connected to the solvent/extract outlet for separating solvent and extract from one another, and wherein the separator includes a condenser having first and second condenser stages connected in series, the second condenser stage operating at a lower temperature than the first stage and both condenser stages supplying substantially uncontaminated solvent to a hollow vessel.

3. Apparatus according to claim 2 wherein the separator includes a rectifier for rectifying the solvent and separating therefrom the extract, a compressor, and a condenser connected in series, whereby the separator generates substantially uncontaminated solvent in liquid form.

4. Apparatus according to claim 3 including pipework for supplying at least some of the substantially uncontaminated solvent from the condenser to the hollow vessel in a substantially closed loop circuit that includes the said vessel.

5. Apparatus according to claim 3 wherein the rectifier includes a still connected to the solvent/extract outlet of the hollow vessel, the still including:

i. a heater for heating any solvent/extract mixture therein to a higher temperature than the solvent dewpoint;

ii. an outlet, for solvent in vapour form, connected to supply such solvent to the suction side of the compressor; and iii. a drain for extract in liquid form.

6. Apparatus according to claim 5 including a vent and a reflux condenser forming part of the vapour path to the vent, the reflux condenser operating at a higher temperature than the solvent dewpoint and at a lower temperature than the biomass extract dewpoint.

7. Apparatus according to claim 2 wherein the second condenser stage includes a vent for venting uncondensed vapour therefrom.

8. Apparatus according to claim 5 wherein the vent is connected to an adsorbent filter that absorbs solvent in the vented vapour.

9. Apparatus according to claim 2, wherein the biomass outlet of the hollow vessel is connected in series to:

i. a heatable check tank; and thence to ii. a further condenser for condensing solvent vaporised on heating of the tank;

the further condenser including an outlet for condensed solvent, the outlet being connected to supply solvent condensed in the further condenser to the hollow vessel.

10. Apparatus according to claim 9 wherein the check tank includes an outlet for liquid biomass.

11. Apparatus according to claim 2 wherein the hollow vessel is or includes an upright, elongate vessel through which a biomass steam rises and a solvent stream descends.

12. Apparatus according to claim 2 wherein the hollow vessel is or includes a mixer-settler unit in which solvent and biomass streams flow in countercurrent.

13. Apparatus according to claim 2 wherein the hollow vessel is or includes a high intensity mixer.

* * * * *